(12) United States Patent
Liu et al.

(10) Patent No.: US 10,925,069 B2
(45) Date of Patent: Feb. 16, 2021

(54) DETECTION WINDOW INDICATION METHOD AND APPARATUS

(71) Applicant: Huawei Technologies Co., Ltd., Shenzhen (CN)

(72) Inventors: Jianqin Liu, Beijing (CN); Xinghua Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/875,508

(22) Filed: May 15, 2020

(65) Prior Publication Data

US 2020/0280994 A1   Sep. 3, 2020

Related U.S. Application Data

(63) Continuation of application No. PCT/CN2018/116060, filed on Nov. 17, 2018.

(30) Foreign Application Priority Data

Nov. 17, 2017 (CN) .......................... 201711148325.4

(51) Int. Cl.
*H04W 72/04* (2009.01)
*H04W 72/00* (2009.01)
*H04W 56/00* (2009.01)

(52) U.S. Cl.
CPC ..... *H04W 72/0493* (2013.01); *H04W 56/001* (2013.01); *H04W 72/005* (2013.01); *H04W 72/0446* (2013.01); *H04W 72/0453* (2013.01)

(58) Field of Classification Search
CPC ............ H04W 56/001; H04W 72/005; H04W 72/0446; H04W 72/0453
See application file for complete search history.

(56) References Cited

U.S. PATENT DOCUMENTS

2008/0205568 A1   8/2008   Oyama
2013/0003905 A1   1/2013   Jain et al.
(Continued)

FOREIGN PATENT DOCUMENTS

CN   101043708 A   9/2007
CN   101682478 A   3/2010
(Continued)

OTHER PUBLICATIONS

"3rd Generation Partnership Project; Technical Specification Group Radio Access Network; NR; Physical channels and modulation (Release 15)," 3GPP TS 38.211 V1.0.0, Sep. 2017, 37 pages.
(Continued)

*Primary Examiner* — Gbemileke J Onamuti
(74) *Attorney, Agent, or Firm* — Slater Matsil, LLP

(57) ABSTRACT

A detection window indication method and apparatus. The method includes receiving control channel configuration information from a network device, where the control channel configuration information indicates a resource multiplexing mode of a resource set of a control channel and a common signal block, and further indicates at least one of a duration of a detection window of the control channel or a time-domain start location of the detection window of the control channel, and detecting, according to the detection window and the resource set, the control channel.

30 Claims, 4 Drawing Sheets

(56) References Cited

U.S. PATENT DOCUMENTS

| 2013/0121249 | A1* | 5/2013 | Ji | ............................ | H04W 4/06 |
| | | | | | 370/328 |
| 2015/0358048 | A1 | 12/2015 | Tsuchida | | |
| 2017/0231001 | A1 | 8/2017 | Yang et al. | | |
| 2017/0310509 | A1 | 10/2017 | Qian et al. | | |
| 2018/0049164 | A1* | 2/2018 | Wu | ....................... | H04W 72/12 |

FOREIGN PATENT DOCUMENTS

| CN | 101827444 | A | 9/2010 |
| CN | 102237928 | A | 11/2011 |
| CN | 103326821 | A | 9/2013 |
| CN | 103379077 | A | 10/2013 |
| CN | 104519591 | A | 4/2015 |
| CN | 105072629 | A | 11/2015 |
| CN | 105517181 | A | 4/2016 |
| CN | 106209277 | A | 12/2016 |
| CN | 106656280 | A | 5/2017 |
| CN | 106900006 | A | 6/2017 |
| CN | 107040977 | A | 8/2017 |
| CN | 107306238 | A | 10/2017 |
| CN | 107734677 | A | 2/2018 |
| WO | 2017196374 | A1 | 11/2017 |

OTHER PUBLICATIONS

"Offline summary for AI 7.1.2.2 Remaining details on Remaining Minimum System Information," Source: CATT, Agenda Item: 7.1.2.2, Document for: Discussion and Decision, 3GPP TSG RAN WG1 Meeting 90bis, R1-1719198, Oct. 9-13, 2017, 15 pages.

"3rd Generation Partnership Project; Technical Specification Group Radio Access Network; NR; Physical layer procedures for control (Release 15)," 3GPP TS 38.213 V1.0.0, Sep. 2017, 16 pages.

3rd Generation Partnership Project; Technical Specification Group Radio Access Network; NR; Radio Resource Control (RRC); Protocol specification (Release 15), 3GPP TS 38.331 V0.1.0, Oct. 2017, 42 pages.

"Benefits of implicit soft combining for PBCH by Polar code construction," Agenda Item: 5.1.4.3, Source: Huawei, HiSilicon, Document for: Discussion and Decision, 3GPP TSG RAN WG1 NR Ad-Hoc#2, R1-1710472, Jun. 27-30, 2017, 6 pages.

"RMSI delivery," Agenda Item: 7.1.2.2, Source: Huawei, HiSilicon, Document for: Discussion and decision, 3GPP TSG RAN WG1 Meeting 90bis, R1-1717050, Oct. 9-13, 2017, 6 pages.

"Discussion on Remaining Minimum System Information," Source: vivo, Agenda Item: 7.1.2.2, Document for: Discussion and Decision, 3GPP TSG RAN WG1 Meeting #90bis, R1-1717461, Oct. 9-13, 2017, 15 pages.

"Discussion on remaining details on RMSI delivery," Source: NTT Docomo, Inc., Agenda Item: 7.1.2.2, Document for: Discussion and Decision, 3GPP TSG RAN WG1 Meeting 90bis, R1-1718181, Oct. 9-13, 2017, 7 pages.

"NR-PBCH Content and Payload Size," Agenda Item: 5.1.1.2.1, Source: Ericsson, Document for: Discussion, Decision, 3GPP TSG RAN WG1 NR Ad-Hoc#2, R1-1711374, Jun. 27-30, 2017, 5 pages.

"Remaining Details of RMSI," Source: ZTE, Sanechips, Agenda Item: 6.1.2.2, Document for: Discussion and Decision, 3GPP TSG RAN WG1 Meeting NR#3, R1-1715378, Sep. 18-21, 2017, 12 pages.

"Discussion on Search Space Design," Agenda Item: 6.3.1.2, Source: LG Electronics, Document for: Discussion and Decision, 3GPP TSG RAN WG1 Meeting NR#3, R1-1715871, Sep. 18-21, 2017, 10 pages.

"Remaining Details on NR-PBCH," Agenda Item: 6.1.2.1, Source: Nokia, Nokia Shanghai Bell, Document for: Discussion and Decision, 3GPP TSG-RAN WG1 NR AH#3, R1-1716524, Sep. 18-21, 2017, 13 pages.

* cited by examiner

DETECTION WINDOW INDICATION METHOD AND APPARATUS

CROSS-REFERENCE TO RELATED APPLICATIONS

This application is a continuation of International Application No. PCT/CN2018/116060, filed on Nov. 17, 2018, which claims priority to Chinese Patent Application No. 201711148325.4, filed on Nov. 17, 2017. The disclosures of the aforementioned applications are hereby incorporated by reference in their entireties.

TECHNICAL FIELD

This application relates to the wireless communications field, and in particular, to a detection window indication method and apparatus.

BACKGROUND

In Long Term Evolution (LTE) technologies, searching of a network device starts in a synchronization process. In the process, time and frequency synchronization is achieved between a terminal and each network device according to a primary synchronization signal (PSS) and a secondary synchronization signal (SSS) that are broadcast by the network device. Specifically, the terminal obtains a physical identifier of the network device, a cyclic prefix length, and a duplex mode of the network device by using the synchronization process. In an initial synchronization process performed after a synchronization signal is detected, the terminal decodes a physical broadcast channel (PBCH) to obtain key system information, mainly including a master information block (MIB) and a system information block (SIB). A synchronization signal that occupies four consecutive orthogonal frequency division multiplexing (OFDM) symbols in a time domain and a broadcast channel form a synchronization signal/broadcast channel block (SS/BCH block). Each network device may send a plurality of SS/BCH blocks in a time division manner. Different SS/BCH blocks are corresponding to different transmit beams. Each SS/BCH block is associated with a detection window of a control channel of one piece of system information. The network device sends control information of system information on a time-frequency resource in the detection window of the control channel. Correspondingly, the terminal performs blind detection on the control channel of the system information in the detection window. Specifically, the terminal performs blind detection on the control channel of the system information on time domain resource and/or frequency domain resource of the detection window.

The foregoing detection window includes a plurality of consecutive slots in the time domain, for example, including one, two, or four consecutive slots. To indicate the detection window, duration and a detection window period, and a time-domain offset (offset) used to determine a start location of the detection window need to be indicated. However, configuration information that is in the broadcast channel and that is used for the control channel of the system information includes a maximum of only eight bits. In addition to indication information of the detection window, the configuration information further includes information indicating a frequency domain resource, a transmission mode, and the like of the control channel. Therefore, a quantity of available bits for indicating the detection window is extremely limited, and the detection window cannot be flexibly indicated.

SUMMARY

This application provides a detection window indication method and apparatus, to flexibly indicate a detection window.

According to a first aspect, this application provides a flexible detection window indication method, including generating, by a network device, control channel configuration information, where the control channel configuration information includes a detection window indication information field of a control channel, and the detection window indication information field of the control channel is used to indicate at least one of the following: duration of a detection window, a detection window period, and information of a time-domain start location of the detection window, and sending, by the network device, the control channel configuration information to a terminal.

In a possible design, one detection window indication information field of the control channel is used to indicate at least two of the following: the duration of the detection window, the detection window period, and the information of the time-domain start location of the detection window, for example, used to indicate the duration of the detection window and the information of the time-domain start location of the detection window.

Optionally, the detection window indication information field of the control channel is used to indicate at least one of the following: the duration of the detection window, the detection window period, and the information of the time-domain start location of the detection window, comprises used to indicate the information of the time-domain start location of the detection window, or, used to indicate the duration of the detection window, or, used to indicate the detection window period, or, used to indicate the duration of the detection window and the information of the time-domain start location of the detection window, or, used to indicate the duration of the detection window and the detection window period, or, used to indicate the information of the time-domain start location of the detection window and the detection window period, or used to indicate the information of the time-domain start location of the detection window, the detection window period, and the duration of the detection window.

It can be understood that in this application, "at least one of A and B" is interpreted as being able to include A, B, or, A and B, wherein the quantity of A can be one or more, and the quantity of B can be one or more. The specific quantity of A or B is not limited.

In a possible design, the detection window indication information field of the control channel indicates any two of the following information: the duration of the detection window, the detection window period, and the information of the time-domain start location of the detection window, and information other than the two of the information indicated by the detection window indication information field of the control channel is preset information, or is determined according to a preset mapping relationship.

In a possible design, the detection window indication information field of the control channel is used to indicate the duration of the detection window and the detection window period, and the method further includes obtaining, by the network device, the information of the time-domain start location of the detection window.

In a possible design, the obtaining, by the network device, the information of the time-domain start location of the detection window includes at least one of the following manners: obtaining, by the network device, information of a preset time-domain start location of the detection window, obtaining, by the network device, the information of the time-domain start location of the detection window according to a carrier frequency corresponding to the control channel, and a mapping relationship between the carrier frequency and the information of the time-domain start location of the detection window, and obtaining, by the network device, the information of the time-domain start location of the detection window according to the duration of the detection window and/or the detection window period.

In a possible design, the detection window indication information field of the control channel is used to indicate the information of the time-domain start location of the detection window and the duration of the detection window, and the method further includes obtaining, by the network device, the detection window period.

In a possible design, the obtaining, by the network device, the detection window period includes at least one of the following manners: obtaining, by the network device, a preset detection window period, obtaining, by the network device, the detection window period according to a period of a common signal block, and obtaining, by the network device, the detection window period according to the duration of the detection window and/or the information of the time-domain start location of the detection window.

In a possible design, the detection window indication information field of the control channel is used to indicate the information of the time-domain start location of the detection window and the detection window period, and the method further includes obtaining, by the network device, the duration of the detection window.

In a possible design, the obtaining, by the network device, the duration of the detection window includes at least one of the following manners: obtaining, by the network device, preset duration of the detection window, obtaining, by the network device, the duration of the detection window according to a carrier frequency corresponding to the control channel, and a mapping relationship between the carrier frequency and the duration of the detection window, and obtaining, by the network device, the duration of the detection window according to the information of the time-domain start location of the detection window and/or the detection window period.

Optionally, the method further includes indicating, by the network device to the terminal by using a broadcast channel, an interval value between detection windows associated with any two adjacent common signal blocks. Different interval values can be configured according to different scenarios, which can flexibly adapt to the requirements from the different scenarios and maximize transmission efficiency of a control channel.

Optionally, the information of the time-domain start location of the detection window is time location information, or the information of the time-domain start location of the detection window is an offset relative to a reference point. Optionally, the reference point is predefined, or is implicitly indicated.

According to a second aspect, this application provides a flexible detection window indication method, including receiving, by a terminal, control channel configuration information sent by a network device, where the control channel configuration information includes a detection window indication information field of a control channel, and the detection window indication information field of the control channel is used to indicate at least one of the following: duration of a detection window, a detection window period, and information of a time-domain start location of the detection window, and determining, by the terminal, the detection window of the control channel according to the control channel configuration information.

The terminal performs blind detection of the control channel of system information on all time domain and/or frequency domain resources in the detection window. Alternatively, the terminal performs blind detection of the control channel of system information on partial time domain and/or frequency domain resources in the detection window. Optionally, the terminal can perform blind detection of the control channel of system information on time/frequency resources outside the detection window.

In a possible design, one detection window indication information field of the control channel is used to indicate at least two of the following: the duration of the detection window, the detection window period, and the information of the time-domain start location of the detection window.

In a possible design, the detection window indication information field of the control channel indicates any two of the following information: the duration of the detection window, the detection window period, and the information of the time-domain start location of the detection window, and information other than the two of the information indicated by the detection window indication information field of the control channel is preset information, or is determined according to a preset mapping relationship.

In a possible design, the detection window indication information field of the control channel is used to indicate the duration of the detection window and the detection window period.

In a possible design, the information of the time-domain start location of the detection window is obtained in at least one of the following manners: the information of the time-domain start location of the detection window is information of a preset time-domain start location of the detection window, obtaining the information of the time-domain start location of the detection window according to a carrier frequency corresponding to the control channel, and a mapping relationship between the carrier frequency and the information of the time-domain start location of the detection window, and obtaining the information of the time-domain start location of the detection window according to the duration of the detection window and/or the detection window period.

In a possible design, the detection window indication information field of the control channel is used to indicate the information of the time-domain start location of the detection window and the duration of the detection window.

In a possible design, the detection window period is obtained in at least one of the following manners: the detection window period is a preset detection window period, obtaining the detection window period according to a period of a common signal block, and obtaining the detection window period according to the duration of the detection window and/or the information of the time-domain start location of the detection window.

In a possible design, the detection window indication information field of the control channel is used to indicate the information of the time-domain start location of the detection window and the detection window period.

In a possible design, the duration of the detection window is obtained in at least one of the following manners: the duration of the detection window is preset duration of the detection window, obtaining the duration of the detection window according to a carrier frequency corresponding to the control channel, and a mapping relationship between the carrier frequency and the duration of the detection window, and obtaining the duration of the detection window according to the information of the time-domain start location of the detection window and/or the detection window period.

Optionally, the method further includes obtaining, by the terminal by using a broadcast channel, an interval value that is between detection windows associated with any two adjacent common signal blocks and that is indicated by the network device.

According to the first aspect and/or the second aspect one or more of the flowing may be applied.

In a possible design, the detection window period or a value range of the detection window period is determined according to a system information transmission time interval.

In a possible design, the duration of the detection window is determined according to the detection window period, or the detection window period is determined according to the duration of the detection window.

In a possible design, the detection window indication information field of the control channel further indicates a resource multiplexing mode of a resource set of the control channel and the common signal block.

In a possible design, the time-domain start location of the detection window and the duration of the detection window that are indicated by the detection window indication information field of the control channel are one of the following: (0, 1), (m, 1), (m, 2), and (m, 4), where m is a real number greater than 0.

In a possible design, a resource multiplexing mode, corresponding to (0, 1), of the resource set of the control channel and the common signal block is a frequency division multiplexing mode, and a resource multiplexing mode, corresponding to (m, 1) or (m, 2) or (m, 4), of the resource set of the control channel and the common signal block is a time division multiplexing mode.

In a possible design, m is determined according to the carrier frequency corresponding to the control channel.

In a possible design, the information of the time-domain start location of the detection window is determined according to the carrier frequency corresponding to the control channel.

In a possible design, the duration of the detection window or a value range of the duration of the detection window is determined according to the carrier frequency corresponding to the control channel.

In a possible design, the information of the time-domain start location of the detection window is determined according to a time interval of the corresponding resource set CORESET of the control channel, that is, may be implicitly indicated by using the time interval of the corresponding resource set CORESET of the control channel.

Specifically, the network device/the terminal may obtain the information of the time-domain start location of the detection window according to the time interval of the CORESET.

In a possible design, the information of the time-domain start location of the detection window is determined according to a system parameter corresponding to the control channel, that is, may be implicitly indicated by using the system parameter corresponding to the control channel.

Specifically, the network device/the terminal may obtain the information of the time-domain start location of the detection window according to the system parameter corresponding to the control channel.

In a possible design, the network device/the terminal may alternatively determine the detection window indication information field according to the resource multiplexing mode of the resource set of the control channel (Control Resource Set, CORESET) and the common signal block.

According to a third aspect, this application provides a detection window indication method, including generating, by a network device, detection window indication information of a control channel, where the detection window indication information is used to indicate one or more of the following: duration of a detection window, a detection window period, and information of a time-domain start location of the detection window, and when a carrier frequency corresponding to the control channel is a first carrier frequency, the detection window indication information includes N1 bits in a physical broadcast channel, or when a carrier frequency corresponding to the control channel is a second carrier frequency, the detection window indication information includes N2 bits in a physical broadcast channel, where N1 is greater than N2, and sending, by the network device, the detection window indication information to a terminal.

In a possible design, at the first carrier frequency, the N1 bits include a common signal block time index field.

According to a fourth aspect, this application provides a detection window indication method, including receiving, by a terminal, detection window indication information sent by a network device, where the detection window indication information is used to indicate one or more of the following: duration of a detection window, a detection window period, and information of a time-domain start location of the detection window, and when a carrier frequency corresponding to the control channel is a first carrier frequency, the detection window indication information includes N1 bits in a physical broadcast channel, or when a carrier frequency corresponding to the control channel is a second carrier frequency, the detection window indication information includes N2 bits in a physical broadcast channel, where N1 is greater than N2, and determining, by the terminal, the detection window of the control channel according to the detection window indication information.

In a possible design, at the first carrier frequency, the N1 bits include a common signal block time index field.

According to a fifth aspect, this application provides a detection window indication apparatus. The apparatus includes modules or means configured to perform the method provided in the first aspect and the implementations of the first aspect.

According to a sixth aspect, this application provides a detection window indication apparatus. The apparatus includes modules or means configured to perform the method provided in the second aspect and the implementations of the second aspect.

According to a seventh aspect, this application provides a detection window indication apparatus. The apparatus includes modules or means configured to perform the method provided in the third aspect and the implementations of the third aspect.

According to an eighth aspect, this application provides a detection window indication apparatus. The apparatus includes modules or means configured to perform the method provided in the fourth aspect and the implementations of the fourth aspect.

According to a ninth aspect, this application provides a detection window indication apparatus. The apparatus includes a transceiver, a processor, and a memory, where the memory is configured to store a program, and the processor invokes the program stored in the memory, to perform the method provided in the first aspect of this application.

According to a tenth aspect, this application provides a detection window indication apparatus. The apparatus includes a transceiver, a processor, and a memory, where the memory is configured to store a program, and the processor invokes the program stored in the memory, to perform the method provided in the second aspect of this application.

According to an eleventh aspect, this application provides a detection window indication apparatus. The apparatus includes a transceiver, a processor, and a memory, where the memory is configured to store a program, and the processor invokes the program stored in the memory, to perform the method provided in the third aspect of this application.

According to a twelfth aspect, this application provides a detection window indication apparatus. The apparatus includes a transceiver, a processor, and a memory, where the memory is configured to store a program, and the processor invokes the program stored in the memory, to perform the method provided in the fourth aspect of this application.

According to a thirteenth aspect, this application provides a detection window indication apparatus, including at least one processing element (or chip) configured to perform the method in the first aspect.

According to a fourteenth aspect, this application provides a detection window indication apparatus, including at least one processing element (or chip) configured to perform the method in the second aspect.

According to a fifteenth aspect, this application provides a detection window indication apparatus, including at least one processing element (or chip) configured to perform the method in the third aspect.

According to a sixteenth aspect, this application provides a detection window indication apparatus, including at least one processing element (or chip) configured to perform the method in the fourth aspect.

According to a seventeenth aspect, this application provides a computer storage medium. The computer storage medium is configured to store a program, where the program is used to perform the method in the first aspect.

According to an eighteenth aspect, this application provides a computer storage medium. The computer storage medium is configured to store a program, where the program is used to perform the method in the second aspect.

According to a nineteenth aspect, this application provides a computer storage medium. The computer storage medium is configured to store a program, where the program is used to perform the method in the third aspect.

According to a twentieth aspect, this application provides a computer storage medium. The computer storage medium is configured to store a program, where the program is used to perform the method in the fourth aspect.

According to a twenty-first aspect, this application provides a processor. The processor includes at least one circuit configured to generate control channel configuration information, where the control channel configuration information includes a detection window indication information field of a control channel, and the detection window indication information field of the control channel is used to indicate at least two of the following: duration of a detection window, a detection window period, and information of a time-domain start location of the detection window, and at least one circuit configured to send the control channel configuration information to a terminal.

According to a twenty-second aspect, this application provides a processor. The processor includes at least one circuit configured to receive control channel configuration information sent by a network device, where the control channel configuration information includes a detection window indication information field of a control channel, and the detection window indication information field of the control channel is used to indicate at least two of the following: duration of a detection window, a detection window period, and information of a time-domain start location of the detection window, and at least one circuit configured to determine the detection window of the control channel according to the control channel configuration information.

According to a twenty-third aspect, this application provides a processor. The processor includes at least one circuit configured to generate detection window indication information of a control channel, where the detection window indication information is used to indicate one or more of the following: duration of a detection window, a detection window period, and information of a time-domain start location of the detection window, and when a carrier frequency corresponding to the control channel is a first carrier frequency, the detection window indication information includes N1 bits in a physical broadcast channel, or when a carrier frequency corresponding to the control channel is a second carrier frequency, the detection window indication information includes N2 bits in a physical broadcast channel, where N1 is greater than N2, and at least one circuit configured to send the detection window indication information to a terminal.

According to a twenty-fourth aspect, this application provides a processor. The processor includes at least one circuit configured to receive detection window indication information sent by a network device, where the detection window indication information is used to indicate one or more of the following: duration of a detection window, a detection window period, and information of a time-domain start location of the detection window, and when a carrier frequency corresponding to a control channel is a first carrier frequency, the detection window indication information includes N1 bits in a physical broadcast channel, or when a carrier frequency corresponding to a control channel is a second carrier frequency, the detection window indication information includes N2 bits in a physical broadcast channel, where N1 is greater than N2, and at least one circuit configured to determine the detection window of the control channel according to the detection window indication information.

According to a twenty-fifth aspect, this application provides a program used to, when running on a device, perform the method according to any one of the foregoing aspects.

According to a twenty-sixth aspect, this application provides a system information indication method, including generating, by a network device, system information indication information, where the system information indication information is used to indicate whether system information corresponding to a common signal block exists, the system information indication information is explicitly or implicitly indicated to a terminal by using N1 bits in a physical broadcast channel of the common signal block, and N1 is an integer greater than 0, and sending, by the network device, the system information indication information to the terminal.

Optionally, the N1 bits are indication information bits used to indicate a physical resource block grid offset, or the N1 bits are CRC (Cyclic Redundancy Check) mask indication bits of a broadcast channel, or the N1 bits are time index indication bits of a common signal block of a broadcast channel and/or control channel configuration information indication bits of system information of a broadcast channel.

According to a twenty-seventh aspect, this application provides a system information indication method, including receiving, by a terminal, system information indication information sent by a network device, where the system information indication information is used to indicate whether system information corresponding to a common signal block exists, and the system information indication information is explicitly or implicitly indicated by using N1 bits in a physical broadcast channel of the common signal block, and determining, by the terminal, system information according to the system information indication information.

Optionally, the N1 bits are indication information bits used to indicate a physical resource block grid offset, or the N1 bits are CRC (Cyclic Redundancy Check) mask indication bits of a broadcast channel, or the N1 bits are time index indication bits of a common signal block of a broadcast channel and/or control channel configuration information indication bits of system information of a broadcast channel.

According to a twenty-eighth aspect, this application provides a system information indication apparatus. The apparatus includes modules or means configured to perform the method provided in the implementations of the twenty-sixth aspect.

According to a twenty-ninth aspect, this application provides a system information indication apparatus. The apparatus includes modules or means configured to perform the method provided in the implementations of the twenty-seventh aspect.

According to a thirtieth aspect, this application provides a system information indication apparatus, including a processor and a memory, where the memory is configured to store a program, and the processor invokes the program stored in the memory, to perform the method provided in the twenty-sixth aspect of this application.

According to a thirty-first aspect, this application provides a system information indication apparatus, including a processor and a memory, where the memory is configured to store a program, and the processor invokes the program stored in the memory, to perform the method provided in the twenty-seventh aspect of this application.

According to the detection window indication method and apparatus provided in this application, the network device generates the control channel configuration information, where the control channel configuration information includes the detection window indication information field of the control channel, and the detection window indication information field of the control channel is used to indicate at least two of the following: the duration of the detection window, the detection window period, and the information of the time-domain start location of the detection window. Further, the network device sends the control channel configuration information to the terminal, and the terminal determines the detection window of the control channel according to the control channel configuration information. This implements that one field is used to indicate at least two of the duration of the detection window, the detection window period, and the information of the time-domain start location of the detection window, and implements an effect of indicating more information by using as fewer bits as possible.

DETAILED DESCRIPTION OF ILLUSTRATIVE EMBODIMENTS

It may be understood that "indication", "mapping", and "relative to" mentioned in the embodiments of this application may be understood as an explicit or implicit manner, and are not specifically limited.

The embodiments of this application may be applied to a wireless communications system. It should be noted that the wireless communications system mentioned in the embodiments of this application includes but is not limited to a Narrowband Internet of Things (NB-IoT) system, a Global System for Mobile Communications (GSM), an Enhanced Data rates for GSM Evolution (EDGE) system, a Wideband Code Division Multiple Access (WCDMA) system, a Code Division Multiple Access 2000 (CDMA2000) system, a Time Division-Synchronous Code Division Multiple Access (TD-SCDMA) system, a Long Term Evolution (LTE) system, and three application scenarios of a next-generation 5G mobile communications system: Enhanced Mobile Broadband (eMBB), URLLC, and massive machine type communications (mMTC).

In the embodiments of this application, a terminal includes but is not limited to a mobile station (MS), a mobile terminal, a mobile telephone, a handset, portable equipment, and the like. The terminal may communicate with one or more core networks by using a radio access network (RAN). For example, the terminal may be a mobile telephone (or referred to as a "cellular" telephone), a computer having a wireless communication function, or the like, or the terminal may be a portable, pocket-sized, handheld, computer built-in, or in-vehicle mobile apparatus or device.

Figure 1:
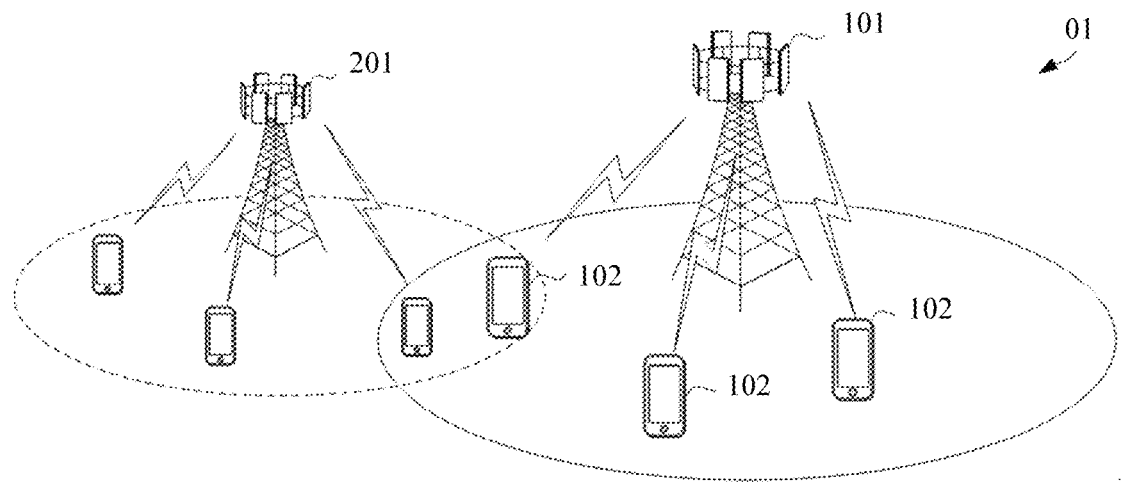
FIG. 1 is a schematic architectural diagram of a communications system according to this application.

FIG. 1 is a schematic architectural diagram of a communications system according to this application.

As shown in FIG. 1, a communications system 01 includes a network device 101 and a terminal 102. When the wireless communications network 01 includes a core network, the network device 101 may be further connected to the core network.

A network device provides a service for a terminal in a coverage area. For example, as shown in FIG. 1, the network device 101 provides radio access for one or more terminals in a coverage area of the network device 101. In addition, there may be an overlapping area between coverage areas of network devices, for example, the network device 101 and a network device 201. The network devices may further communicate with each other. For example, the network device 101 may communicate with the network device 201.

The network device 101 may be a device configured to communicate with a terminal. For example, the network device 101 may be a base transceiver station (BTS) in a GSM system or a CDMA system, may be a NodeB (NB) in a WCDMA system, or may be an evolved NodeB (eNB or eNodeB) in an LTE system, a network-side device in a future 5G network, or the like. Alternatively, the network device may be a relay station, an access point, an in-vehicle device, or the like. In a device-to-device (D2D) communications system, the network device may alternatively be a terminal that functions as a base station. The terminal may include various handheld devices, in-vehicle devices, wearable devices, and computing devices that have a wireless communication function, or other processing devices connected to a wireless modem, user equipment (UE) and mobile stations (MSes) that are in various forms, and the like.

Figure 2:
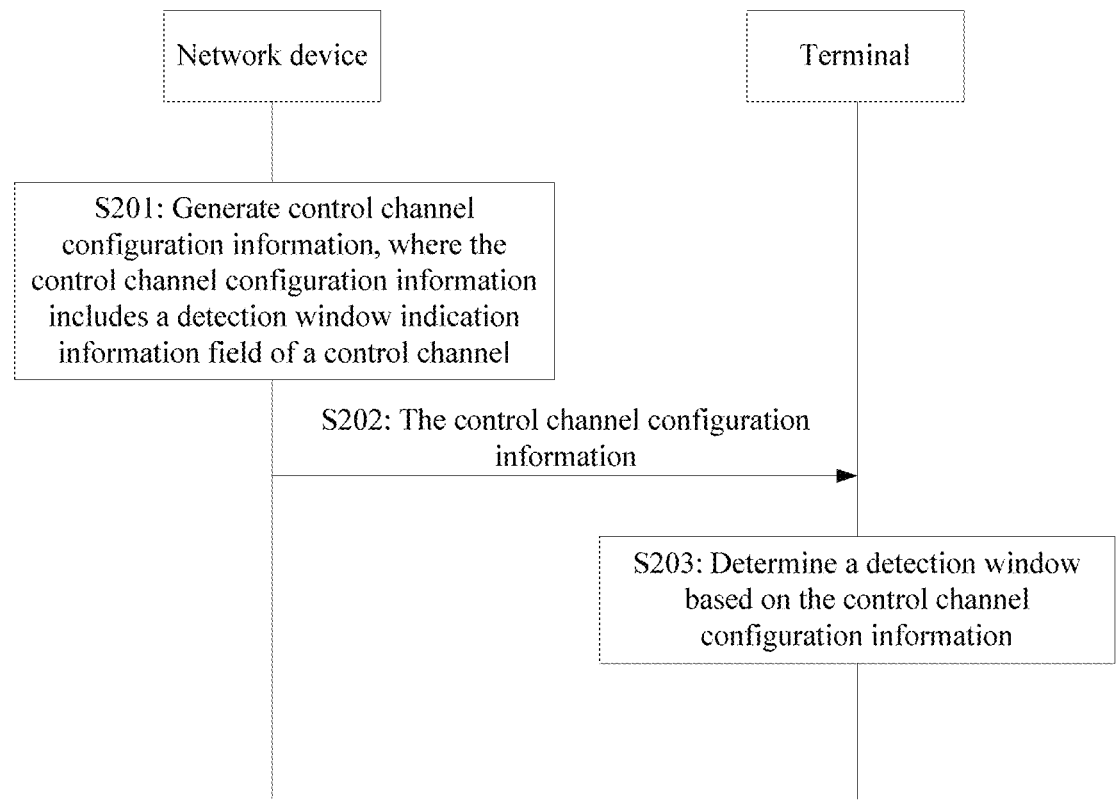
FIG. 2 is a schematic flowchart of a detection window indication method according to an embodiment of this application.

FIG. 2 is a schematic flowchart of a detection window indication method according to an embodiment of this application. As shown in FIG. 2, the method includes the following steps.

S201: A network device generates control channel configuration information.

The control channel configuration information includes a detection window indication information field of a control channel. The detection window indication information field of the control channel is used to indicate at least one of the following: duration of a detection window, a detection window period, and information of a time-domain start location of the detection window.

Specifically, when the detection window indication information field of the control channel indicates any one of the duration of the detection window, the detection window period, and the information of the time-domain start location of the detection window, the other two may be preset, or may be obtained according to a preset mapping relationship.

Examples are described as follows.

(a) When the detection window indication information field of the control channel indicates the duration of the detection window, the detection window period and the information of the time-domain start location of the detection window may be a preset detection window period and information of a preset time-domain start location of the detection window.

Alternatively, the network device/a terminal obtains the information of the time-domain start location of the detection window according to a carrier frequency corresponding to the control channel, and a mapping relationship between the carrier frequency and the information of the time-domain start location of the detection window of the control channel. The network device/the terminal may obtain the detection window period according to a period of a common signal block, and a mapping relationship between the period of the common signal block and the detection window period.

Alternatively, the information of the time-domain start location of the detection window is determined according to the duration of the detection window, and a mapping relationship between the information of the time-domain start location of the detection window and the duration of the detection window. Similarly, the detection window period is determined according to the duration of the detection window, and a mapping relationship between the detection window period and the duration of the detection window.

(b) When the detection window indication information field of the control channel indicates the detection window period, the duration of the detection window and the information of the time-domain start location of the detection window may be preset duration of the detection window and information of a preset time-domain start location of the detection window.

Alternatively, the network device/a terminal obtains the information of the time-domain start location of the detection window according to a carrier frequency corresponding to the control channel, and a mapping relationship between the carrier frequency and the information of the time-domain start location of the detection window of the control channel. The network device/the terminal obtains the duration of the detection window according to the carrier frequency corresponding to the control channel, and a mapping relationship between the carrier frequency and the duration of the detection window.

Alternatively, the duration of the detection window is determined according to the detection window period, and a mapping relationship between the duration of the detection window and the detection window period. Similarly, the information of the time-domain start location of the detection window is determined according to the detection window period, and a mapping relationship between the information of the time-domain start location of the detection window and the detection window period.

(c) When the detection window indication information field of the control channel indicates the information of the time-domain start location of the detection window, the duration of the detection window is preset duration of the detection window, and the detection window period is a preset detection window period.

Alternatively, the network device/a terminal obtains the duration of the detection window according to a carrier frequency corresponding to the control channel, and a mapping relationship between the carrier frequency and the duration of the detection window. The network device/the terminal may obtain the detection window period according to a period of a common signal block, and a mapping relationship between the period of the common signal block and the detection window period.

Alternatively, the duration of the detection window is determined according to the information of the time-domain start location of the detection window, and a mapping relationship between the duration of the detection window and the information of the time-domain start location of the detection window. The detection window period is determined according to the information of the time-domain start location of the detection window, and a mapping relationship between the detection window period and the information of the time-domain start location of the detection window.

Alternatively, further, the detection window indication information field of the control channel is used to indicate at least two of the following: the duration of the detection window, the detection window period, and the information of the time-domain start location of the detection window.

In this application, the detection window indication information field of the control channel may include one or more bits. Values of the field are corresponding to different detection window indication information. For example, a specific value of the field is corresponding to a group of the duration of the detection window and the detection window period, or a specific value of the field is corresponding to a group of the duration of the detection window and the information of the time-domain start location of the detection window, or a specific value of the field is corresponding to a group of the detection window period and the information of the time-domain start location of the detection window, or a specific value of the field is corresponding to a group of the duration of the detection window, the detection window period, and the information of the time-domain start location of the detection window.

The information of the time-domain start location of the detection window may be information of a time location (for example, a slot, a symbol, or a symbol of a slot), or may be an offset of the detection window relative to a reference point (namely, information of a relative time location, for example, an offset relative to a slot or a symbol). The terminal may determine the time-domain start location of the detection window according to the information of the time-domain start location of the detection window.

Optionally, the reference point may be a time point corresponding to a common signal block, for example, an $i^{th}$ SS/BCH block, where i is a natural number greater than or equal to 1. Alternatively, the reference point may be another time point, for example, a fixed frame, a fixed slot, or a fixed symbol. The reference point may be predefined, or may be implicitly indicated. No specific limitation is imposed herein.

Optionally, each SS/BCH block is associated with a detection window of a control channel. A time-domain start location of the detection window (for example, starting slot) may be determined according to an index of a SS/BCH block associated with the detection window and an offset between a detection window associated with the first SS/BCH block and a start time-domain location of a system frame. The offset between a detection window associated with the first SS/BCH block and a start time-domain location of a system frame may be determined according to a protocol, for example, determined according to a fixed value and a sub-carrier spacing.

Optionally, after determining a starting slot, a symbol offset in the slot can be further determined. It can be understood that the time-domain start location of the detection window starts from a symbol in the slot. The specific symbol may be determined according to a configuration or a protocol.

The manner provided in this application avoids a case in which "the duration of the detection window, the detection window period, and the information of the time-domain start location of the detection window" and other detection window information each occupy some bits. Through joint encoding, one field may be used to indicate a combination of at least two of detection window information, thereby saving bits. It should be noted that joint encoding and indication may be performed by using at least one of the foregoing detection window information and other configuration information of the control channel such as at least one of a size of a resource set of the control channel, a time interval of the resource set of the control channel, and comb information of the resource set of the control channel. No specific limitation is imposed herein.

In addition, the common signal block in this application may include at least one of a synchronization signal (SS) block and a physical broadcast channel (PBCH) block, and may be denoted as an SS/PBCH block.

An SS may include a primary synchronization signal (PSS) and a secondary synchronization signal (SSS).

S202: The network device sends the control channel configuration information to a terminal.

Optionally, the network device sends the control channel configuration information to the terminal by using a physical broadcast channel.

S203: The terminal determines a detection window of the control channel according to the control channel configuration information.

The terminal may determine the detection window of the control channel after obtaining the control channel configuration information. The network device sends control information on a time-frequency resource in the detection window. Correspondingly, the terminal performs blind detection on the control channel in the detection window.

The control channel herein may be a control channel of system information, a control channel of a random access response, or a control channel of a paging channel. No specific limitation is imposed in this application. A control channel of A is a scheduling channel of A, where A may be any one of the system information, the random access response, or the paging channel. A control channel of system information can be included in a control resource set (CORESET) of a Type0-physical downlink control channel (PDCCH). Configuration information of the CORESET of the Type0-PDCCH may be indicated by indication information pdcch-ConfigSIB1 in MIB. A time/frequency resource location (for example, consecutive resource blocks (RBs) and consecutive symbols) is indicated by the four most significant bits and the four least significant bits in the indication information. The Type0-PDCCH may be used to transmit scheduling information of system information block 1 (SIB1) which may also be called remaining minimum system information (RMSI).

The system information may be any one of remaining minimum system information (RMSI), other system information (OSI), or another type of system information. No specific limitation is imposed in this application.

In this embodiment, the network device generates the control channel configuration information, where the control channel configuration information includes the detection window indication information field of the control channel, and the detection window indication information field of the control channel is used to indicate at least two of the following: the duration of the detection window, the detection window period, and the information of the time-domain start location of the detection window. Further, the network device sends the control channel configuration information to the terminal, and the terminal determines the detection window of the control channel according to the control channel configuration information. This implements that one field is used to indicate at least two of the duration of the detection window, the detection window period, and the information of the time-domain start location of the detection window, and implements an effect of indicating more information by using as fewer bits as possible.

Optionally, the detection window indication information field of the control channel indicates any two of the following information: the duration of the detection window, the detection window period, and the information of the time-domain start location of the detection window.

Correspondingly, information other than the two of the information indicated by the detection window indication information field of the control channel is preset information, or is determined according to a preset mapping relationship.

In other words, when the detection window indication information field of the control channel indicates the two of the information, the other may be preconfigured, or may be implicitly indicated by using the preset mapping relationship.

In an implementation, the detection window indication information field of the control channel is used to indicate the duration of the detection window and the detection window period.

For example, the detection window indication information field of the control channel includes only two bits, which may indicate four information values of "the duration (unit: slot) of the detection window and the period (unit: millisecond (ms)) of the detection window". For example, a possible value set of the duration of the detection window is {1 slot, 2 slots, 4 slots}, and a possible value set of the detection window period is {10 ms, 20 ms, 40 ms, 80 ms}.

Optionally, the four information values of the "the duration of the detection window and the detection window period" may include (4 slots, 80 ms), (2 slots, 40 ms), (1 slot, 20 ms), and (1 slot, 10 ms), or (4 slots, 40 ms), (2 slots, 20 ms), (2 slots, 10 ms), and (1 slot, 10 ms), or (4 slots, 80 ms), (2 slots, 40 ms), (2 slots, 20 ms), and (1 slot, 10 ms).

Specifically, four cases (4 slots, 80 ms), (2 slots, 40 ms), (1 slot, 20 ms), and (1 slot, 10 ms) are used as examples. When the two bits of the detection window indication information field of the control channel are "00", (4 slots, 80 ms) is indicated, when the two bits are "01", (2 slots, 40 ms) is indicated, when the two bits are "10", (1 slot, 20 ms) is indicated, or when the two bits are "11", (1 slot, 10 ms) is indicated. Certainly, the foregoing examples are not construed as a limitation. For example, a possible value of the duration of the detection window may be another value different from the foregoing values, for example, 8 slots, and a possible value of the detection window period may also be another value different from the foregoing values, for example, 160 ms. No specific limitation is imposed herein.

For another example, the detection window indication information field of the control channel includes only three bits, which may indicate eight information values of "the duration of the detection window and the detection window period". For example, a possible value set of the duration of the detection window is {1 slot, 2 slots, 4 slots}, and a possible value set of the detection window period is {10 ms, 20 ms, 40 ms, 80 ms}.

Optionally, the eighth information values of the "the duration of the detection window and the detection window period" may include (4 slots, 80 ms), (4 slots, 40 ms), (4 slots, 20 ms), (2 slots, 40 ms), (2 slots, 20 ms), (2 slots, 10 ms), (1 slot, 20 ms), and (1 slot, 10 ms), or (4 slots, 80 ms), (4 slots, 40 ms), (4 slots, 20 ms), (4 slots, 10 ms), (2 slots, 80 ms), (2 slots, 40 ms), (2 slots, 20 ms), and (2 slots, 10 ms).

Similar to the foregoing example, different values of the detection window indication information field of the control channel may be corresponding to different information values of "the duration of the detection window and the detection window period". It is assumed that "000" indicates (4 slots, 80 ms), and others are similar. Details are not described one by one.

The four two-bit information values of "the duration of the detection window and the detection window period" and the eight three-bit information values of "the duration of the detection window and the detection window period" satisfy: Larger duration of the detection window is corresponding to a larger detection window period, or a larger detection window period is corresponding to larger duration of the detection window. In other words, the detection window period may be determined according to the duration of the detection window, or the duration of the detection window may be determined according to the detection window period. Scheduling flexibility of the control channel is determined according to both the duration of the detection window and the detection window period of the control channel, and the foregoing configuration method can maximize the scheduling flexibility of the control channel. In conclusion, this design can reduce a quantity of bits of detection window indication information of the control channel, and can also maximize configuration flexibility of the detection window, thereby ensuring the scheduling flexibility of the control channel.

Correspondingly, the network device further needs to obtain the information of the time-domain start location of the detection window. The terminal also needs to obtain the information of the time-domain start location of the detection window.

In a specific implementation process, the information of the time-domain start location of the detection window may be obtained in at least one of the following manners.

(1) The network device/the terminal obtains the information of a preset time-domain start location of the detection window.

To be specific, the network device/the terminal may preset the information of the time-domain start location of the detection window by using a protocol or through information exchange.

(2) The information of the time-domain start location of the detection window of the control channel is associated with the carrier frequency corresponding to the control channel.

Specifically, the network device/the terminal may obtain the information of the time-domain start location of the detection window according to the carrier frequency corresponding to the control channel, and the mapping relationship between the carrier frequency and the information of the time-domain start location of the detection window of the control channel.

To be specific, the network device/the terminal presets the mapping relationship between the carrier frequency and the information of the time-domain start location of the detection window of the control channel.

For example, the information of the time-domain start location of the detection window is an offset of the detection window relative to a reference point. For example, when a carrier frequency band corresponding to the control channel is less than 6 gigahertz (GHz), an offset of the detection window relative to an SS/BCH block is 0 time units, or when a carrier frequency band corresponding to the control channel is greater than or equal to 6 GHz, an offset of the detection window relative to an SS/BCH block is M time units, where M is a real number greater than 0. A specific value of M is not limited herein. The time unit may be at least one of a slot, a half-frame, a frame, a time interval of the SS/BCH block, a short slot of at least one symbol, or the like. It should be understood that classification of carrier frequency bands herein is merely a possible example, and there may be another carrier frequency band classification method.

(3) The information of the time-domain start location of the detection window is implicitly indicated by using the duration of the detection window and/or the detection window period.

Specifically, the network device/the terminal may obtain the information of the time-domain start location of the detection window according to the duration of the detection window and/or the detection window period.

After determining the duration of the detection window and/or the detection window period, the network device/the terminal may obtain the information of the time-domain start location of the detection window according to the duration of the detection window, and the mapping relationship between the duration of the detection window and the information of the time-domain start location of the detection window. For example, larger duration of the detection window indicates a larger offset indicating the information of the time-domain start location of the detection window. Alternatively, a value of the duration of the detection window is directly configured to be corresponding to a value of a time-domain start location of the detection window.

Alternatively, the network device/the terminal may obtain the information of the time-domain start location of the detection window according to the detection window period, and the mapping relationship between the detection window period and the information of the time-domain start location of the detection window. Similarly, a larger detection window period may indicate a larger offset indicating the information of the time-domain start location of the detection window. Alternatively, a value of the detection window period is directly configured to be corresponding to a value of a time-domain start location of the detection window.

Alternatively, the network device/the terminal may obtain the information of the time-domain start location of the detection window according to the duration of the detection window, the detection window period, and a mapping relationship between "the duration of the detection window and the detection window period" and the information of the time-domain start location of the detection window. No limitation is imposed herein. Similarly, larger duration of the detection window may indicate a larger detection window period. Alternatively, a value of the duration of the detection window is directly configured to be corresponding to a value of the detection window period.

For a method for obtaining the information of the time-domain start location of the detection window by the terminal, refer to the method for obtaining the information of the time-domain start location of the detection window by the network device.

In another possible implementation, the detection window indication information field of the control channel is used to indicate the information of the time-domain start location of the detection window and the duration of the detection window.

For example, the detection window indication information field of the control channel includes three bits, which may indicate eight information values of "the information of the time-domain start location of the detection window and the duration of the detection window".

Optionally, the eight information values of "the information of the time-domain start location of the detection window and the duration of the detection window" include (0 offsets, 1 slot), (0 offsets, 2 slots), (0 offsets, 4 slots), (1 offset, 1 slot), (1 offset, 2 slots), (m offsets, 1 slot), (m offsets, 2 slots), and (m offsets, 4 slots), where m is a real number greater than 0.

The duration of the detection window may consist of N time units. A time unit may be a slot, a mini-slot (including one or more symbols), a frame, a sub-frame, a half frame, a time-domain interval corresponding to a control channel resource set or a time-domain interval corresponding to a common signal block. The offset indicates an offset unit of the detection window. One offset may be a time of one of the following orders of magnitude: a slot, a mini-slot (a time-domain interval including one, two, four, or seven symbols), a frame, a subframe, a half-frame, a time-domain interval corresponding to a resource set of a control channel, a time-domain interval corresponding to a common signal block, and the like. No specific limitation is imposed herein.

Different values of the detection window indication information field of the control channel indicate different "information of time-domain start locations of the detection window and duration of the detection window". It is assumed that "000" indicates (0 offsets, 1 slot), and others are similar. No specific limitation is imposed herein.

Correspondingly, the network device further needs to obtain the detection window period. The terminal also needs to obtain the detection window period after receiving the configuration information.

Similar to that in the foregoing embodiment, the network device may obtain the detection window period in at least one of the following manners.

(1) The network device/the terminal obtains the preset detection window period.

To be specific, the network device/the terminal presets or determines the detection window period.

(2) The detection window period is associated with the period of the common signal block. Herein, the common signal block may include at least one of a synchronization signal (SS) block and a physical broadcast channel (PBCH) block, and may be denoted as an SS/PBCH block.

Specifically, the network device/the terminal may obtain the detection window period according to the period of the common signal block. For example, the network device/the terminal may preset or determine the mapping relationship between the period of the common signal block and the detection window period. In this way, the detection window period of the control channel may be obtained after the period of the common signal block is obtained. Optionally, the network device/the terminal may predefine that the detection window period of the control channel is equal to the period of the common signal block, or may predefine that the detection window period of the control channel is equal to k times of the period of the common signal block, where k herein is a predefined natural number.

(3) The detection window period is implicitly indicated by using the duration of the detection window and/or the information of the time-domain start location of the detection window.

After determining the duration of the detection window and/or the information of the time-domain start location of the detection window, the network device/the terminal may obtain the detection window period according to the duration of the detection window, and the mapping relationship between the duration of the detection window and the detection window period. Larger duration of the detection window may indicate a larger detection window period. Alternatively, a value of the duration of the detection window is directly configured to be corresponding to a value of the detection window period.

Alternatively, the network device/the terminal may obtain the detection window period according to the information of the time-domain start location of the detection window, and the mapping relationship between the information of the time-domain start location of the detection window and the detection window period. Similarly, a larger offset indicating the information of the time-domain start location of the detection window may indicate a larger detection window period. Alternatively, a value of a time-domain start location of the detection window is directly configured to be corresponding to a value of the detection window period.

Alternatively, the network device/the terminal may obtain the detection window period according to the duration of the detection window, the information of the time-domain start location of the detection window, and a mapping relationship between "the duration of the detection window and the information of the time-domain start location of the detection window" and the detection window period. No limitation is imposed herein. Larger duration of the detection window may indicate a larger offset indicating the information of the time-domain start location of the detection window. Alternatively, a value of the duration of the detection window is directly configured to be corresponding to a value indicating a time-domain start location of the detection window.

The network device/the terminal may obtain the detection window period according to the information of the time-domain start location of the detection window, and the mapping relationship between the information of the time-domain start location of the detection window and the information of the time-domain start location of the detection window. Optionally, the information of the time-domain start location of the detection window is a relative time offset of the detection window relative to a first common signal block (SS block) of a first common signal block set (SS block burst set) sent by the network device. The terminal may obtain period information of the detection window through deducing according to the offset.

For a specific process of obtaining the detection window period by the terminal, refer to the foregoing process of obtaining the detection window period by the network device. Details are not described herein again.

In an embodiment, the detection window indication information field of the control channel is used to indicate the information of the time-domain start location of the detection window and the detection window period.

The method further includes obtaining, by the network device, the duration of the detection window.

In a possible design, the obtaining, by the network device, the duration of the detection window includes at least one of the following manners: obtaining, by the network device, preset duration of the detection window, obtaining, by the network device, the duration of the detection window according to a carrier frequency corresponding to the control channel, and a mapping relationship between the carrier frequency and the duration of the detection window, and obtaining, by the network device, the duration of the detection window according to the information of the time-domain start location of the detection window and/or the detection window period.

For a process of obtaining the duration of the detection window by a terminal side, refer to the process of obtaining the duration of the detection window by the network device. Details are not described herein again.

In another embodiment, the detection window indication information field of the control channel indicates a combination of "the duration of the detection window, the detection window period, and the information of the time-domain start location of the detection window".

In this case, a value of one of the information may be determined according to the other one or two of the information.

For example, the duration of the detection window is determined according to the detection window period and/or the information of the time-domain start location of the detection window. For example, a larger detection window period or larger information of a time-domain start location of the detection window (indicating the offset of the information of the time-domain start location of the detection window) or both indicate larger duration of the detection window.

The detection window period is determined according to the duration of the detection window and/or the information of the time-domain start location of the detection window. For example, larger duration of the detection window or larger information of a time-domain start location of the detection window (indicating the offset of the information of the time-domain start location of the detection window) or both indicate a larger detection window period.

The information of the time-domain start location of the detection window is determined according to the duration of the detection window and/or the detection window period. For example, larger duration of the detection window or a larger detection window period or both indicate larger time-domain start location information of the detection window (indicating the offset of the information of the time-domain start location of the detection window).

According to the foregoing embodiments, the detection window period or a value range of the detection window period may be determined according to a system information transmission time interval.

Before the configuration information is determined, the detection window period or the value range of the detection window period may be first determined according to the system information transmission time interval (RMSI TTI). This can further reduce a possibility of a combination of "the duration of the detection window, the detection window period, and the information of the time-domain start location of the detection window", so that the detection window indication information field requires fewer bits.

For example, when the RMSI TI is 80 ms, the detection window period may be at least one value in the following set: {10 ms, 20 ms, 40 ms, 80 ms}.

When the RMSI TI is 160 ms, the detection window period may be at least one value in the following set: {20 ms, 40 ms, 80 ms, 160 ms}.

The system information transmission time interval also needs to be sent to the terminal by using the physical broadcast channel. To reduce signaling overheads of the physical broadcast channel, the system information transmission time interval may be predefined, or may be implicitly indicated.

Optionally, if the network device and the terminal side predefine a quantity of system information transmission repetitions, the network device and the terminal side may implicitly determine a period of a detection window of the control channel of the system information according to the predefined quantity of repetitions and the system information transmission time interval configured in the broadcast channel. Conversely, if the network device and the terminal side predefine a quantity of system information transmission repetitions, the network device and the terminal side may implicitly determine the system information transmission time interval according to the predefined quantity of repetitions and the period, configured in the broadcast channel, of the detection window of the control channel of the system information.

In another implementation, if the network device and the terminal side may predefine the system information transmission time interval, the network device and the terminal side may implicitly determine a period of a detection window of the control channel of the system information according to the predefined transmission time interval and a quantity of system information transmission repetitions that is configured in the broadcast channel, or may implicitly determine a quantity of system information transmission repetitions according to the predefined transmission time interval and a period of a detection window of the control channel of the system information.

Optionally, the network device and the terminal side may alternatively predefine the detection window period of the control channel, and the network device and the terminal side may implicitly determine a quantity of system information transmission repetitions according to the predefined detection window period and the system information transmission time interval configured in the broadcast channel, or may implicitly determine the system information transmission time interval according to the predefined detection window period and a quantity of system information transmission repetitions that is configured in the broadcast channel.

In addition, the duration of the detection window and the detection window period may be associated with each other. This can achieve resource scheduling flexibility for the control channel of the system information.

For example, the duration of the detection window is determined according to the detection window period, or the detection window period is determined according to the duration of the detection window.

Figure 3:
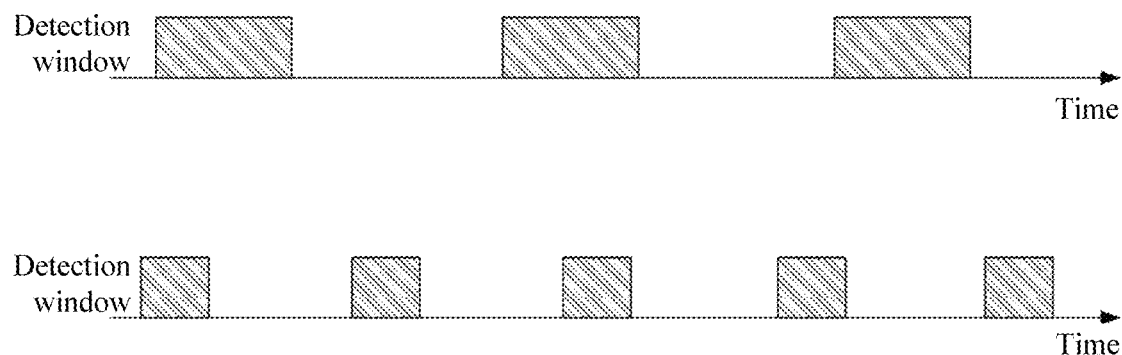
FIG. 3 is a schematic structural diagram of a detection window according to this application.

FIG. 3 is a schematic structural diagram of a detection window according to this application. Each shaded block identifies one detection window.

As shown in FIG. 3, larger duration of the detection window indicates a larger period of a detection window.

In other words, a larger detection window period indicates larger duration of a detection window.

Further, the detection window indication information field of the control channel may further indicate a resource multiplexing mode of a resource set of the control channel (Control Resource Set, CORESET) and a common signal block.

Conversely, the network device/the terminal may alternatively determine the detection window indication information field according to the resource multiplexing mode of the resource set of the control channel (Control Resource Set, CORESET) and the common signal block.

For example, the network device/the terminal determines a value of the duration of the detection window according to the resource multiplexing mode of the CORESET and the common signal block. When the multiplexing mode is a frequency division multiplexing mode, the duration of the detection window is one slot, or when the multiplexing mode is a time division multiplexing mode, the duration of the detection window is greater than one slot, for example, two or four slots.

The resource multiplexing mode herein may include the time division multiplexing mode, the frequency division multiplexing mode, and the like. In addition to indicating detection window related information, the detection window indication information field of the control channel may further indicate the resource multiplexing mode of the resource set of the control channel and the common signal block. For example, the resource multiplexing mode of the resource set CORESET of the control channel and the common signal block is indirectly indicated by using a mapping relationship between the detection window information (one or more of the duration of the detection window, the detection window period, and the information of the time-domain start location of the detection window) and "the resource multiplexing mode of the resource set of the control channel and the common signal block".

Optionally, it is assumed that a time-domain start location (whose unit is an offset relative to a reference point) of the detection window and the duration (whose unit is a slot) of the detection window that are indicated by the detection window indication information field of the control channel are one of the following: (0, 1), (m, 1), (m, 2), and (m, 4), where m is a real number greater than 0.

On this basis, a resource multiplexing mode, corresponding to (0, 1), of the resource set of the control channel and the common signal block is the frequency division multiplexing mode.

A resource multiplexing mode, corresponding to (m, 1) or (m, 2) or (m, 4), of the resource set of the control channel and the common signal block is the time division multiplexing mode.

To be specific, when it is assumed that the detection window indication information field of the control channel indicates that "the time-domain start location (offset) of the detection window and the duration (slot) of the detection window" are (0, 1), it indirectly indicates that the resource multiplexing mode, corresponding to (0, 1), of the resource set of the control channel and the common signal block is the frequency division multiplexing mode.

The foregoing embodiments are not construed as a limitation. Alternatively, a mapping relationship between "the duration of the detection window and the detection window period" and the resource multiplexing mode of the resource set of the control channel and the common signal block may be preset. An indirect indication manner thereof is similar. Details are not described herein again.

Further, m may be determined according to the carrier frequency corresponding to the control channel of the detection window.

A mapping relationship between the carrier frequency corresponding to the control channel and m may be preset or determined. Examples are as follows. When the carrier frequency corresponding to the control channel is less than 3 GHz, m=4, when the carrier frequency corresponding to the control channel is greater than or equal to 3 GHz and less than 6 GHz, m=8, or when the carrier frequency corresponding to the control channel is greater than or equal to 6 GHz, m=64.

According to the foregoing embodiments, the detection window period or a value range of the detection window period may be determined according to a system information transmission time interval.

Before the configuration information is determined, the detection window period or the value range of the detection window period may be first determined according to the system information transmission time interval (RMSI TTI). This can further reduce a possibility of a combination of "the duration of the detection window, the detection window period, and the information of the time-domain start location of the detection window", so that the detection window indication information field requires fewer bits.

For example, when the RMSI TTI is 80 ms, the detection window period may be at least one value in the following set: {10 ms, 20 ms, 40 ms, 80 ms}.

When the RMSI TTI is 160 ms, the detection window period may be at least one value in the following set: {20 ms, 40 ms, 80 ms, 160 ms}.

Optionally, the information of the time-domain start location of the detection window may also be determined according to the carrier frequency corresponding to the control channel. A difference from the foregoing determining, by the network device, the information of the time-domain start location of the detection window according to the carrier frequency corresponding to the control channel lies in that the information of the time-domain start location of the detection window may be a preset value, or may be implicitly determined according to the carrier frequency corresponding to the control channel.

For example, when a carrier frequency band corresponding to the control channel is less than 6 gigahertz (GHz), the time-domain start location of the detection window is a time unit 0 in a frame or a half-frame, or when a carrier frequency band corresponding to the control channel is greater than or equal to 6 GHz, the time-domain start location of the detection window is a time unit M in a frame or a half-frame, where M is a real number greater than 0. Optionally, the time unit herein may be a slot, a mini-slot (a time-domain interval including one, two, four, or seven symbols), a frame, a subframe, a half-frame, a time-domain interval corresponding to a resource set of a control channel, a time-domain interval corresponding to a common signal block, or the like. No specific limitation is imposed herein. It should be understood that classification of carrier frequency bands herein is merely a possible example, and there may be another carrier frequency band classification method.

The terminal may correspondingly determine the information of the time-domain start location of the detection window after obtaining the carrier frequency corresponding to the control channel. Before or after obtaining the control channel configuration information, the network device may also determine the information of the time-domain start location of the detection window according to the carrier frequency corresponding to the control channel.

Alternatively, the information of the time-domain start location of the detection window is determined according to a time interval of the corresponding resource set CORESET of the control channel, that is, may be implicitly indicated by using the time interval of the corresponding resource set CORESET of the control channel.

Specifically, the network device/the terminal may obtain the information of the time-domain start location of the detection window according to the time interval of the CORESET. After determining the time interval of the CORESET of the control channel, the network device/the terminal may obtain the information of the time-domain start location of the detection window according to the time interval of the CORESET, and a mapping relationship between the time interval of the CORESET and the information of the time-domain start location of the detection window. Conversely, after the information of the time-domain start location of the detection window is determined, the time interval of the CORESET is obtained according to the information of the time-domain start location of the detection window, and the mapping relationship between the time interval of the CORESET and the information of the time-domain start location of the detection window.

Alternatively, the information of the time-domain start location of the detection window is determined according to a system parameter corresponding to the control channel, that is, may be implicitly indicated by using the system parameter corresponding to the control channel.

Specifically, the network device/the terminal may obtain the information of the time-domain start location of the detection window according to the system parameter corresponding to the control channel.

After determining the system parameter corresponding to the control channel, the network device/the terminal may obtain the information of the time-domain start location of the detection window according to the system parameter, and a mapping relationship between the system parameter of the control channel and the information of the time-domain start location of the detection window. The system parameter may be subcarrier spacing information for signal transmission. Herein, the system parameter corresponding to the control channel is the same as a system parameter of a data channel scheduled by the control channel. The data channel scheduled by the control channel may be a channel for transmitting system information, a channel for transmitting a random access response, a paging channel, or the like.

Similarly, the duration of the detection window or a value range of the duration of the detection window may also be determined according to the carrier frequency corresponding to the control channel.

For example, when a carrier frequency band corresponding to the control channel is less than 6 GHz, the duration of the detection window or the value range of the duration of the detection window may be any one of the following: 1 slot and 2 slots. When a carrier frequency band corresponding to the control channel is greater than or equal to 6 GHz, the duration of the detection window or the value range of the duration of the detection window may be any one of the following: 2 slots and 4 slots. It should be noted that classification of carrier frequency bands herein is merely a possible example, and there may be another carrier frequency band classification method.

The terminal may correspondingly determine the duration of the detection window after obtaining the carrier frequency corresponding to the control channel. Before or after obtaining the control channel configuration information, the network device may also determine the duration of the detection window or the value range of the duration of the detection window according to the carrier frequency corresponding to the control channel.

Similarly, the detection window period may alternatively be determined according to the carrier frequency corresponding to the control channel. For example, when a carrier frequency band corresponding to the control channel is less than 6 GHz, the detection window period or the value range of the detection window period may be any one of the following: 10 ms, 20 ms, 40 ms, and 80 ms.

When a carrier frequency band corresponding to the control channel is greater than or equal to 6 GHz, the detection window period or the value range of the detection window period may be any one of the following: 20 ms, 40 ms, 80 ms, and 160 ms. It should be noted that classification of carrier frequency bands herein is merely a possible example, and there may be another carrier frequency band classification method.

The terminal may correspondingly determine the detection window period after obtaining the carrier frequency corresponding to the control channel. Before or after obtaining the control channel configuration information, the network device may also determine the detection window period or the value range of the detection window period according to the carrier frequency corresponding to the control channel.

It should be noted that detection windows associated with a plurality of different SS/BCH blocks may overlap or partially overlap. In other words, a plurality of common signal blocks may share a detection window. Detection windows associated with a plurality of consecutive common signal blocks may be consecutive or nonconsecutive. No specific limitation is imposed herein.

According to the foregoing embodiments, the network device may further indicate, to the terminal by using the broadcast channel, an interval value between detection windows associated with any two adjacent common signal blocks. The interval value herein is a time interval value which may indicate an interval between starting symbols of detection windows. The adjacent herein refers to two adjacent common signal blocks, for example, two adjacent common signal blocks in the same slot.

Optionally, the network device may flexibly configure, for the terminal according to actually transmitted common signal blocks or a quantity of actually transmitted common signal blocks, the time interval value between the detection windows associated with the any two adjacent common signal blocks. A candidate time interval value between the detection windows may include at least one of values such as 0, ⅓, ½, 1, and 2.

0 indicates that the detection windows associated with the any two adjacent common signal blocks completely overlap. A candidate value greater than 0 and less than 1, such as ⅓ or ½, indicates that the detection windows associated with the any two adjacent common signal blocks partially overlap. A candidate value greater than or equal to 1, such as 1 or 2, indicates that the detection windows associated with the any two adjacent common signal blocks do not overlap. An interval length is one or two detection window lengths.

The terminal determines, according to the time interval value and a detected time index of a common signal block, an actual location of a detection window associated with the common signal block.

Figure 4:
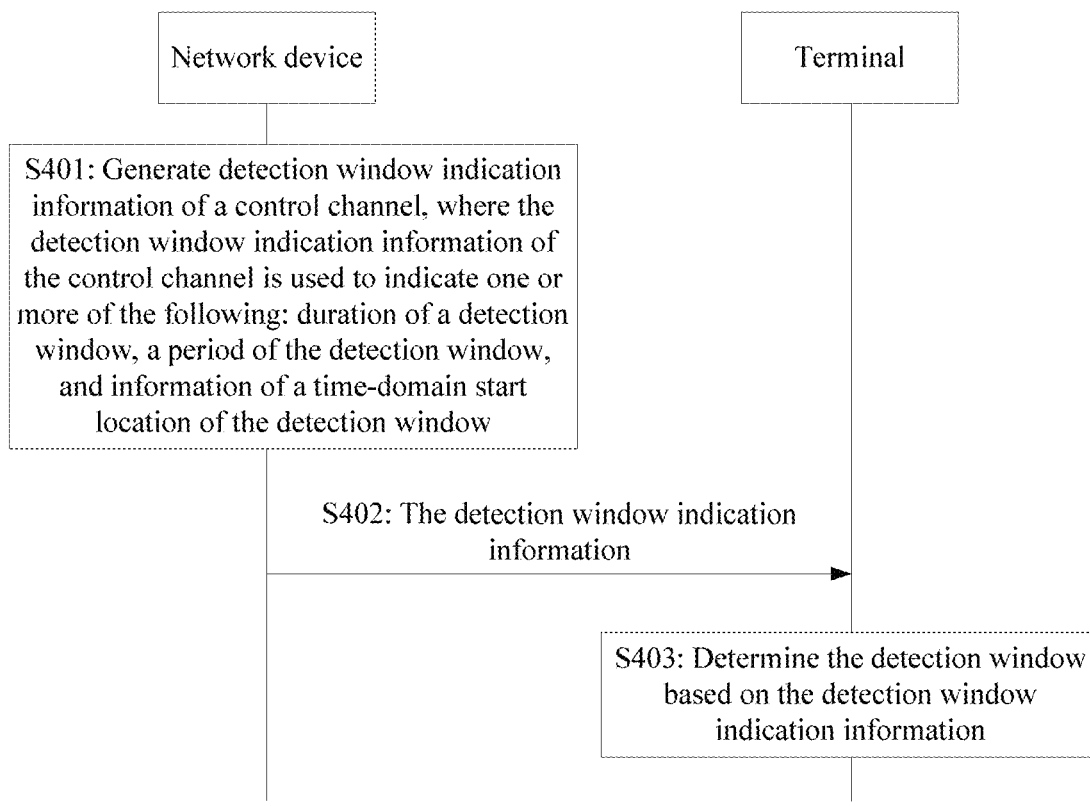
FIG. 4 is a schematic flowchart of a detection window indication method according to another embodiment of this application.

FIG. 4 is a schematic flowchart of a detection window indication method according to another embodiment of this application. As shown in FIG. 4, the method includes the following steps.

S401: A network device generates detection window indication information of a control channel, where the detection window indication information of the control channel is used to indicate one or more of the following: duration of a detection window, a detection window period, and information of a time-domain start location of the detection window.

When a carrier frequency corresponding to the control channel is a first carrier frequency, the detection window indication information of the control channel includes N1 bits in a physical broadcast channel.

When a carrier frequency corresponding to the control channel is a second carrier frequency, the detection window indication information of the control channel includes N2 bits in a physical broadcast channel.

N1 is greater than N2, and both N1 and N2 are integers greater than 0.

It should be noted that a quantity of available bits varies depending on different carrier frequencies. A quantity of available bits at the first carrier frequency is greater than that at the second carrier frequency. In this case, when the carrier frequency corresponding to the control channel is the first carrier frequency, more bits may be used to indicate detection window information.

S402: The network device sends the detection window indication information to a terminal.

S403: The terminal determines the detection window according to the detection window indication information.

In this embodiment, the network device generates the detection window indication information of the control channel, to indicate one or more of the following: the duration of the detection window, the detection window period, and the information of the time-domain start location of the detection window. When the carrier frequency corresponding to the control channel is the first carrier frequency, the detection window indication information of the control channel includes the N1 bits in the physical broadcast channel. When the carrier frequency corresponding to the control channel is the second carrier frequency, the detection window indication information of the control channel includes the N2 bits in the physical broadcast channel. N1 is greater than N2. Further, the network device sends the detection window indication information to the terminal, and the terminal determines the detection window according to the detection window indication information. This implements that the detection window is flexibly indicated by as more bits as possible according to different quantities of available bits at different carrier frequencies. This can also indicate more different detection windows.

Optionally, when the carrier frequency corresponding to the control channel is the first carrier frequency, the N1 bits include a common signal block time index field.

It should be noted that, when the carrier frequency corresponding to the control channel is the first carrier frequency, there is an unused field in a physical broadcast channel payload (payload). The unused idle field may be used to indicate the detection window.

For example, the first carrier frequency may be any carrier frequency band less than or equal to 6 GHz. When the carrier frequency corresponding to the control channel is less than or equal to 6 GHz, there is an unused three-bit common signal block time index field in a PBCH payload. In this case, in addition to bits that originally can be used for the detection window indication information of the control channel, the three-bit common signal block time index field may be further added.

Correspondingly, the second carrier frequency is any carrier frequency band greater than 6 GHz.

Further, this application further provides a system information indication method. The system information indication method may be independent of other implementations of this application, or may be used together with other implementations of this application.

A network device generates system information indication information, where the system information indication information is used to indicate whether system information corresponding to a common signal block exists, and the system information indication information is explicitly or implicitly indicated to a terminal by using N1 bits in a physical broadcast channel of the common signal block, and sends the system information indication information to the terminal. The terminal receives the system information indication information, and then determines system information. N1 is an integer greater than 0.

The N1 bits are indication information bits used to indicate a physical resource block grid offset, or the N1 bits are CRC (Cyclic Redundancy Check) mask indication bits of a broadcast channel, or the N1 bits are time index indication bits of a common signal block of a broadcast channel and/or control channel configuration information indication bits of system information of a broadcast channel.

Specifically, each common signal block is associated with a detection window of a control channel of one piece of system information. Further, one common signal block is usually associated with one piece of system information (for example, RMSI). In a scenario with extremely high system bandwidth and/or a plurality of beams, when there are many common signal blocks in a cell in a time domain and a frequency domain, and each common signal block is associated with one piece of system information, resource overheads of system information in the cell are extremely large. In addition, the terminal performs joint channel quality measurement on a plurality of common signal blocks. This can improve channel quality measurement precision, such as measurement precision of radio resource management (RRM) measurement. However, to obtain basic system access information, there is no need to read a plurality of pieces of system information. Therefore, to reduce resource overheads of system information and avoid unnecessary system information transmission, some common signal blocks may not be associated with corresponding system information. A base station may explicitly or implicitly notify, by using a broadcast channel, the terminal of whether each common signal block is associated with corresponding system information, such as RMSI. In other words, the network device explicitly or implicitly notifies, by using a broadcast channel in each common signal block, the terminal of whether RMSI corresponding to the common signal block exists.

The explicit manner is explicitly adding one bit to the broadcast channel of the common signal block to indicate whether the RMSI corresponding to the common signal block exists. The implicit manner is using specific states of some domain fields in the broadcast channel, and optionally, indicating, by the network device by using the broadcast channel of the common signal block in the following manners, whether the RMSI corresponding to the common signal block exists as described below.

(1) The network device indicates, by using physical resource block grid offset indication information in the broadcast channel of the common signal block, whether the RMSI (also can be called SIB1) corresponding to the common signal block exists. Indicating whether the SIB1 corresponding to the common signal block exists can also be understood indicating whether scheduling information of the SIB1 corresponding to the common signal block exists. The scheduling information of the SIB1 can be included in information carried in a CORESET of a Type0-PDCCH wherein the CORESET is used for a common search space of the Type0-PDCCH. Indicating whether the SIB1 corresponding to the common signal block exists can also be understood indicating whether the CORESET which corresponds to the common signal block and is used for the common search space of the Type0-PDCCH exists.

The physical resource block grid offset can be in unit of sub-carrier. The physical resource block grid offset indication information is mainly used as a time-frequency resource indication of RMSI and an RMSI CORESET (also can be called CORESET of Type0-PDCCH) at an initial access stage, and is specifically used to indicate information about an offset of a physical resource block grid of the common signal block relative to an index of a system common physical resource block, for example, a quantity of offset sub-carriers. A normal value of the physical resource block grid offset indication information in the broadcast channel includes any one of {0, 1, 2, 3, 4, 5, 6, 7, 8, 9, 10, 11}. When the common signal block has no corresponding RMSI, the information field has some specific states. In this case, the network device sets a value of the physical resource block grid offset indication information in the broadcast channel to a particular value, for example, any other value different from the normal value of the physical resource block grid offset indication information, such as 12. When the common signal block has corresponding RMSI, a value of the physical resource block grid offset indication information in the broadcast channel is the normal value of the indication information, namely, any one of {0, 1, 2, 3, 4, 5, 6, 7, 8, 9, 10, 11}. Whether each common signal block has corresponding RMSI may be implicitly indicated according to different values of the physical resource block grid offset indication information in the broadcast channel of the common signal block.

(2) The network device implicitly indicates, by using a CRC mask in the broadcast channel of the common signal block, whether the RMSI corresponding to the common signal block exists. For example, a case in which the RMSI corresponding to the common signal block exists is corresponding to one mask value, and a case in which the RMSI corresponding to the common signal block does not exist is corresponding to another mask value.

(3) At a first carrier frequency band (less than 6 GHz), the network device explicitly indicates, by using a common signal block time index information field in the broadcast channel of the common signal block, whether the RMSI corresponding to the common signal block exists, and/or at a second carrier frequency band (greater than or equal to 6 GHz), the network device indicates, by using an RMSI control channel configuration information field in the broadcast channel of the common signal block, whether the RMSI corresponding to the common signal block exists. A specific indication method is similar to manner (1) of performing indication by using indication information of an offset of a physical resource block relative to coordinates. To be specific, whether each common signal block has corresponding RMSI is implicitly indicated according to different values of any one or more fields in RMSI control channel configuration information.

Figure 5:
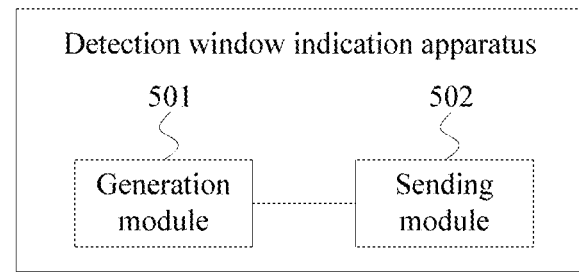
FIG. 5 is a schematic structural diagram of a detection window indication apparatus according to an embodiment of this application.

FIG. 5 is a schematic structural diagram of a detection window indication apparatus according to an embodiment of this application. The apparatus may be integrated in the foregoing network device. As shown in FIG. 5, the apparatus includes a generation module 501 and a sending module 502.

The generation module 501 is configured to generate control channel configuration information, where the control channel configuration information includes a detection window indication information field of a control channel, and the detection window indication information field of the control channel is used to indicate at least two of the following: duration of a detection window, a detection window period, and information of a time-domain start location of the detection window.

The sending module 502 is configured to send the control channel configuration information to a terminal.

Optionally, the detection window indication information field of the control channel indicates any two of the following information: the duration of the detection window, the detection window period, and the information of the time-domain start location of the detection window.

Information other than the two of the information indicated by the detection window indication information field of the control channel is preset information, or is determined according to a preset mapping relationship.

Figure 6:
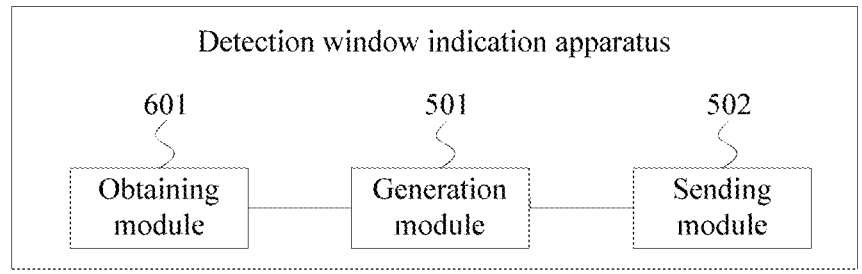
FIG. 6 is a schematic structural diagram of a detection window indication apparatus according to another embodiment of this application.

FIG. 6 is a schematic structural diagram of a detection window indication apparatus according to another embodiment of this application. According to FIG. 5, the apparatus further includes an obtaining module 601.

In an implementation, the detection window indication information field of the control channel is used to indicate the duration of the detection window and the detection window period.

The obtaining module 601 is configured to obtain the information of the time-domain start location of the detection window.

Specifically, the obtaining module 601 specifically obtains the information of the time-domain start location of the detection window in at least one of the following manners: obtaining information of a preset time-domain start location of the detection window, obtaining the information of the time-domain start location of the detection window according to a carrier frequency corresponding to the control channel, and a mapping relationship between the carrier frequency and the information of the time-domain start location of the detection window, and obtaining the information of the time-domain start location of the detection window according to the duration of the detection window and/or the detection window period.

In another implementation, the detection window indication information field of the control channel is used to indicate the information of the time-domain start location of the detection window and the duration of the detection window.

The obtaining module 601 is configured to obtain the detection window period.

Specifically, the obtaining module 601 specifically obtains the detection window period in at least one of the following manners: obtaining a preset detection window period, obtaining the detection window period according to a period of a common signal block, and obtaining the detection window period according to the duration of the detection window and/or the information of the time-domain start location of the detection window.

Figure 7:
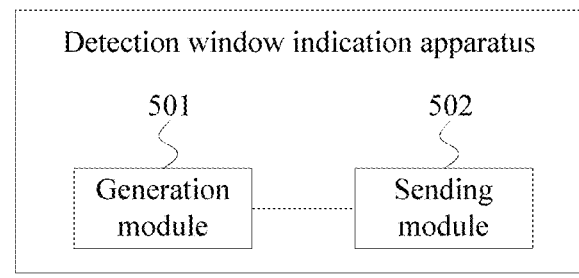
FIG. 7 is a schematic structural diagram of a detection window indication apparatus according to still another embodiment of this application.

FIG. 7 is a schematic structural diagram of a detection window indication apparatus according to still another embodiment of this application. The apparatus may be integrated in the foregoing terminal. As shown in FIG. 7, the apparatus includes a receiving module 701 and a determining module 702.

The receiving module 701 is configured to receive control channel configuration information sent by a network device, where the control channel configuration information includes a detection window indication information field of a control channel, and the detection window indication information field of the control channel is used to indicate at least two of the following: duration of a detection window, a detection window period, and information of a time-domain start location of the detection window.

The determining module 702 is configured to determine the detection window of the control channel according to the control channel configuration information.

Optionally, the detection window indication information field of the control channel indicates any two of the following information: the duration of the detection window, the detection window period, and the information of the time-domain start location of the detection window.

Information other than the two of the information indicated by the detection window indication information field of the control channel is preset information, or is determined according to a preset mapping relationship.

Optionally, the detection window indication information field of the control channel is used to indicate the duration of the detection window and the detection window period.

Optionally, the information of the time-domain start location of the detection window is obtained in at least one of the following manners: the information of the time-domain start location of the detection window is information of a preset time-domain start location of the detection window, obtaining the information of the time-domain start location of the detection window according to a carrier frequency corresponding to the control channel, and a mapping relationship between the carrier frequency and the information of the time-domain start location of the detection window, and obtaining the information of the time-domain start location of the detection window according to the duration of the detection window and/or the detection window period.

Optionally, the detection window indication information field of the control channel is used to indicate the information of the time-domain start location of the detection window and the duration of the detection window.

Optionally, the detection window period is obtained in at least one of the following manners: the detection window period is a preset detection window period, obtaining the detection window period according to a period of a common signal block, and obtaining the detection window period according to the duration of the detection window and/or the information of the time-domain start location of the detection window.

According to FIG. 5 to FIG. 7, the following may optionally be applied.

Optionally, the detection window period or a value range of the detection window period is determined according to a system information transmission time interval.

Optionally, the duration of the detection window is determined according to the detection window period, or the detection window period is determined according to the duration of the detection window.

Further, the detection window indication information field of the control channel further indicates a resource multiplexing mode of a resource set of the control channel and the common signal block.

The time-domain start location of the detection window and the duration of the detection window that are indicated by the detection window indication information field of the control channel are one of the following: (0, 1), (m, 1), (m, 2), and (m, 4), where m is a real number greater than 0.

A resource multiplexing mode, corresponding to (0, 1), of the resource set of the control channel and the common signal block is a frequency division multiplexing mode.

A resource multiplexing mode, corresponding to (m, 1) or (m, 2) or (m, 4), of the resource set of the control channel and the common signal block is a time division multiplexing mode.

m is determined according to the carrier frequency corresponding to the control channel.

In addition, the information of the time-domain start location of the detection window is determined according to the carrier frequency corresponding to the control channel.

Optionally, the duration of the detection window or a value range of the duration of the detection window is determined according to the carrier frequency corresponding to the control channel.

The apparatus may be configured to perform the methods provided in the foregoing method embodiments. A specific implementation and a technical effect are similar to those of the method embodiments. Details are not described herein again.

It should be noted that the module division of the apparatus is merely logical function division. In actual implementation, all or some of the modules may be integrated into one physical entity, or may be physically separated. In addition, all of the modules may be implemented by software invoked by a processing element, or all of the modules may be implemented by hardware, or some of the modules may be implemented by software invoked by a processing element, and some of the modules may be implemented by hardware. For example, the obtaining module may be an independent processing element, or may be integrated in a chip of the apparatus. Alternatively, the obtaining module may be stored in a memory of the apparatus in a form of program code, and invoked and executed by a processing element of the apparatus. The apparatus may be configured to perform the methods provided in the foregoing method embodiments. A specific implementation and a technical effect are similar to those of the method embodiments. Details are not described herein again.

It should be noted that the module division of the apparatus is merely logical function division. In actual implementation, all or some of the modules may be integrated into one physical entity, or may be physically separated. In addition, all of the modules may be implemented by software invoked by a processing element, or all of the modules may be implemented by hardware, or some of the modules may be implemented by software invoked by a processing element, and some of the modules may be implemented by hardware. For example, the determining module may be an independent processing element, or may be integrated in a chip of the apparatus. Alternatively, the determining module may be stored in a memory of the apparatus in a form of program code, and a processing element of the apparatus invokes and executes a function of the determining module. Implementations of other modules are similar thereto. Moreover, some or all of the modules may be integrated, or may be independently implemented. The processing element herein may be an integrated circuit with a signal processing capability. In an implementation process, steps in the foregoing methods or the foregoing modules may be implemented by using a hardware integrated logic circuit in the processor element, or by using instructions in a form of software.

For example, the modules may be configured as one or more integrated circuits to implement the foregoing methods, for example, one or more application-specific integrated circuits (ASIC), one or more microprocessors (DSP), or one or more field programmable gate arrays (FPGA). For another example, when one of the modules is implemented by program code invoked by a processing element, the processing element may be a general-purpose processor, such as a central processing unit (CPU), or another processor that can invoke program code. For another example, the modules may be integrated, and implemented in a form of a system-on-a-chip (SOC). Functions of the modules. Implementations of other modules are similar thereto. Moreover, some or all of the modules may be integrated, or may be independently implemented. The processing element herein may be an integrated circuit with a signal processing capability. In an implementation process, steps in the foregoing methods or the foregoing modules may be implemented by using a hardware integrated logic circuit in the processor element, or by using instructions in a form of software.

For example, the modules may be configured as one or more integrated circuits to implement the foregoing methods, for example, one or more application-specific integrated circuits (ASIC), one or more microprocessors (DSP), or one or more field programmable gate arrays (FPGA). For another example, when one of the modules is implemented by program code invoked by a processing element, the processing element may be a general-purpose processor, such as a central processing unit (CPU), or another processor that can invoke program code. For another example, the modules may be integrated, and implemented in a form of a system-on-a-chip (SOC).

Figure 8:
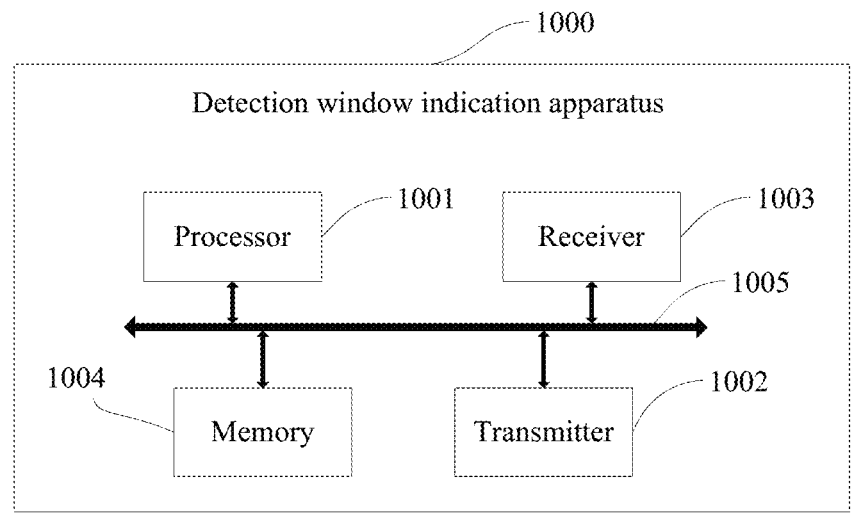
FIG. 8 is a schematic structural diagram of a detection window indication apparatus according to yet another embodiment of this application.

FIG. 8 is a schematic structural diagram of a detection window indication apparatus according to yet another embodiment of this application. The apparatus may be integrated in the foregoing network device. As shown in FIG. 8, the apparatus 1000 includes a processor 1001, a memory 1004, a receiver 1003, and a transmitter 1002.

The receiver 1003 and the transmitter 1002 are configured to communicate with another network element. The memory 1004 is configured to store a program that can be executed by the processor 1001. The program includes an instruction used to implement the methods, the steps, or the processes in the foregoing embodiments.

For details about the methods, the processes, the steps, benefits, and the like, refer to the descriptions of the content in the foregoing embodiments. Details are not described herein again.

Figure 9:
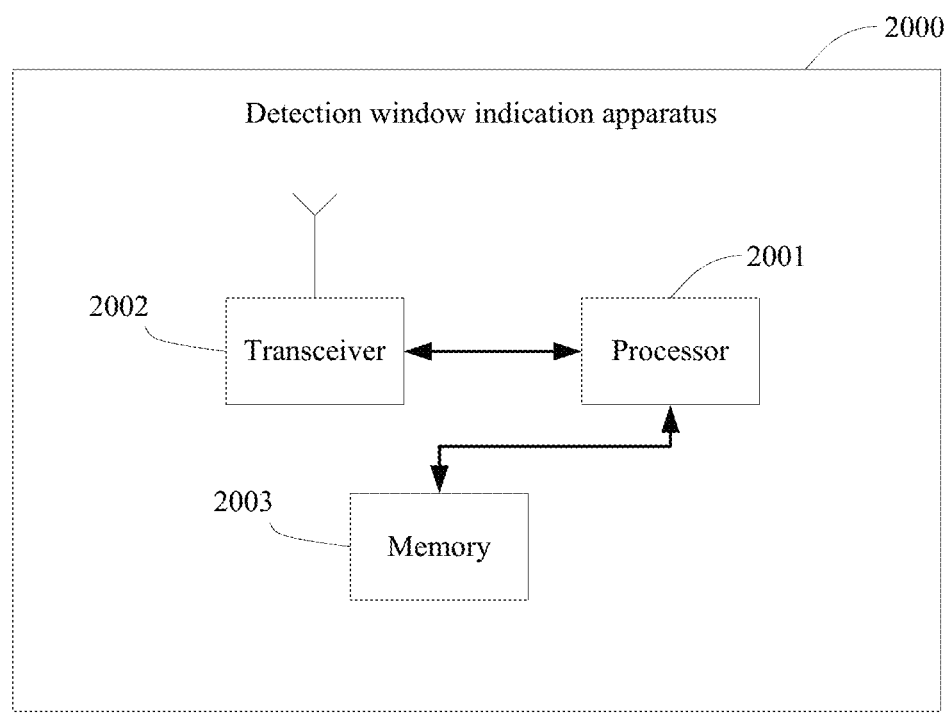
FIG. 9 is a schematic structural diagram of a detection window indication apparatus according to still yet another embodiment of this application.

FIG. 9 is a schematic structural diagram of a detection window indication apparatus according to still yet another embodiment of this application. The apparatus may be integrated in the foregoing terminal. As shown in FIG. 9, the apparatus 2000 includes a processor 2001, a memory 2003, and a transceiver 2002.

The transceiver 2002 is configured to communicate with another network element (may communicate with the another network element by using an antenna). The memory 2003 is configured to store a program that can be executed by the processor 2001. The program includes an instruction used to implement the methods, the steps, or the processes in the foregoing embodiments. For details about the methods, the processes, the steps, benefits, and the like, refer to the descriptions of the content in the foregoing embodiments. Details are not described herein again.

Optionally, when the detection window indication methods in the foregoing embodiments are completely or partially implemented by software, the detection window indication apparatus may alternatively include only a processor. A memory configured to store a program is located outside the detection window indication apparatus. The processor is connected to the memory by using a circuit or a wire, to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory may include a transitory memory, such as a random access memory (RAM), or the memory may include a non-transitory memory, such as a flash memory (flash memory), a hard disk drive (HDD), or a solid-state drive (SSD), or the memory may include a combination of the foregoing types of memories.

In another embodiment, the processor is further configured to generate detection window indication information of a control channel, where the detection window indication information is used to indicate one or more of the following: duration of a detection window, a detection window period, and information of a time-domain start location of the detection window, and when a carrier frequency corresponding to the control channel is a first carrier frequency, the detection window indication information includes N1 bits in a physical broadcast channel, or when a carrier frequency corresponding to the control channel is a second carrier frequency, the detection window indication information includes N2 bits in a physical broadcast channel, where N1 is greater than N2, and send the detection window indication information to a terminal.

Alternatively, in another embodiment, the processor is further configured to receive detection window indication information sent by a network device, where the detection window indication information is used to indicate one or more of the following: duration of a detection window, a detection window period, and information of a time-domain start location of the detection window, and when a carrier frequency corresponding to the control channel is a first carrier frequency, the detection window indication information includes N1 bits in a physical broadcast channel, or when a carrier frequency corresponding to the control channel is a second carrier frequency, the detection window indication information includes N2 bits in a physical broadcast channel, where N1 is greater than N2, and determine the detection window of the control channel according to the detection window indication information.

An embodiment of this application further provides a computer storage medium. The computer storage medium stores a computer program. The computer program is used to perform the detection window indication methods provided in the foregoing embodiments.

An embodiment of this application further provides a computer program product including an instruction. When the computer program product runs on a computer, the computer performs the detection window indication methods provided in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. An apparatus, comprising:
one or more processors;
a non-transitory memory coupled to the one or more processors, wherein the non-transitory memory stores a program to be executed by the one or more processors, the program including instructions for:
receiving control channel configuration information from a network device, wherein the control channel configuration information indicates a resource multiplexing mode of a resource set of a control channel and a common signal block, and further indicates a duration of a detection window of the control channel and a time-domain start location of the detection window of the control channel; and
detecting, according to the detection window and the resource set, the control channel.

2. The apparatus according to claim 1, wherein at least one of:
the time-domain start location of the detection window is 0, and the duration of the detection window is 1; or
the time-domain start location of the detection window is m, and the duration of the detection window is 1, 2 or 4, wherein m is a real number greater than 0.

3. The apparatus according to claim 2, wherein m is associated with a carrier frequency corresponding to the control channel.

4. The apparatus according to claim 1, wherein the time-domain start location of the detection window is associated with a carrier frequency corresponding to the control channel.

5. The apparatus according to claim 1, wherein the control channel configuration information further indicates a time interval value between two detection windows.

6. The apparatus according to claim 5, wherein the two detection windows are respectively associated with two common signal blocks.

7. The apparatus according to claim 5, wherein the time interval value is 1/2 slot, 1 slot, or 2 slots.

8. The apparatus according to claim 1, wherein the program further includes instructions for:
receiving indication information indicating whether system information corresponding to a common signal block exists, wherein the indication information comprises N1 bits in a physical broadcast channel (PBCH) of the common signal block, and wherein N1 is an integer greater than 0.

9. The apparatus according to claim 1, wherein the common signal block comprises a primary synchronization signal (PSS), a secondary synchronization signal (SSS) and a physical broadcast channel (PBCH).

10. A method, comprising:
receiving control channel configuration information from a network device, wherein the control channel configuration information indicates a resource multiplexing mode of a resource set of a control channel and a common signal block, and further indicates a duration of a detection window of the control channel and a time-domain start location of the detection window of the control channel; and
detecting, according to the detection window and the resource set, the control channel.

11. The method according to claim 10, wherein at least one of:
the time-domain start location of the detection window is 0, and the duration of the detection window is 1; or
the time-domain start location of the detection window is m, and the duration of the detection window is 1, 2 or 4, wherein m is a real number greater than 0.

12. The method according to claim 11, wherein m is associated with a carrier frequency corresponding to the control channel.

13. The method according to claim 10, wherein the time-domain start location of the detection window is associated with a carrier frequency corresponding to the control channel.

14. The method according to claim 10, wherein the control channel configuration information further indicates a time interval value between two detection windows.

15. The method according to claim 14, wherein the two detection windows are respectively associated with two common signal blocks.

16. The method according to claim 14, wherein the time interval value is 1/2 slot, 1 slot, or 2 slots.

17. The method according to claim 10, further comprising:
receiving indication information indicating whether system information corresponding to a common signal block exists, wherein the indication information comprises N1 bits in a physical broadcast channel (PBCH) of the common signal block, and wherein N1 is an integer greater than 0.

18. The method according to claim 10, wherein the common signal block comprises a primary synchronization signal (PSS), a secondary synchronization signal (SSS) and a physical broadcast channel (PBCH).

19. A non-transitory computer readable medium, wherein the non-transitory computer readable medium stores instructions that are executable by a computer, and the instructions comprise instructions for:
receiving control channel configuration information from a network device, wherein the control channel configuration information indicates a resource multiplexing mode of a resource set of a control channel and a common signal block, and further indicates a duration of a detection window of the control channel and a time-domain start location of the detection window of the control channel; and
detecting, according to the detection window and the resource set, the control channel.

20. The non-transitory computer readable medium according to claim 19, wherein at least one of:
the time-domain start location of the detection window is 0, and the duration of the detection window is 1; or
the time-domain start location of the detection window is m, and the duration of the detection window is 1, 2 or 4, wherein m is a real number greater than 0.

21. The non-transitory computer readable medium according to claim 20, wherein m is associated with a carrier frequency corresponding to the control channel.

22. The non-transitory computer readable medium according to claim 19, wherein the time-domain start location of the detection window is associated with a carrier frequency corresponding to the control channel.

23. The non-transitory computer readable medium according to claim 19, wherein the control channel configuration information further indicates a time interval value between two detection windows.

24. The non-transitory computer readable medium according to claim 23, wherein the two detection windows are respectively associated with two common signal blocks.

25. The non-transitory computer readable medium according to claim 23, wherein the time interval value is 1/2 slot, 1 slot, or 2 slots.

26. The non-transitory computer readable medium according to claim 19, wherein the instructions further comprise instructions for:
receiving indication information indicating whether system information corresponding to a common signal block exists, wherein the indication information comprises N1 bits in a physical broadcast channel (PBCH) of the common signal block, and wherein N1 is an integer greater than 0.

27. The non-transitory computer readable medium according to claim 19, wherein the common signal block comprises a primary synchronization signal (PSS), a secondary synchronization signal (SSS) and a physical broadcast channel (PBCH).

28. An apparatus, comprising:
one or more processors;
a non-transitory memory coupled to the one or more processors, wherein the non-transitory memory stores a program to be executed by the one or more processors, the program including instructions for:
generating control channel configuration information, wherein the control channel configuration information indicates a resource multiplexing mode of a resource set of a control channel and a common signal block, and further indicates a duration of a detection window of the control channel and a time-domain start location of a detection window of the control channel; and
sending the control channel configuration information to a terminal.

29. The apparatus according to claim 28, wherein at least one of:
the time-domain start location of the detection window is 0, and the duration of the detection window is 1; or
the time-domain start location of the detection window is m, and the duration of the detection window is 1, 2 or 4, wherein m is a real number greater than 0.

30. The apparatus according to claim 28, wherein the program further includes instructions for:
sending indication information indicating whether system information corresponding to a common signal block exists, wherein the indication information comprises N1 bits in a physical broadcast channel (PBCH) of the common signal block, and wherein N1 is an integer greater than 0.

* * * * *